Dec. 6, 1966   G. R. CHAFEE, JR   3,290,587
DRYNESS SENSOR FOR AUTOMATIC FABRIC DRYING MACHINE
Filed March 16, 1964   2 Sheets-Sheet 1
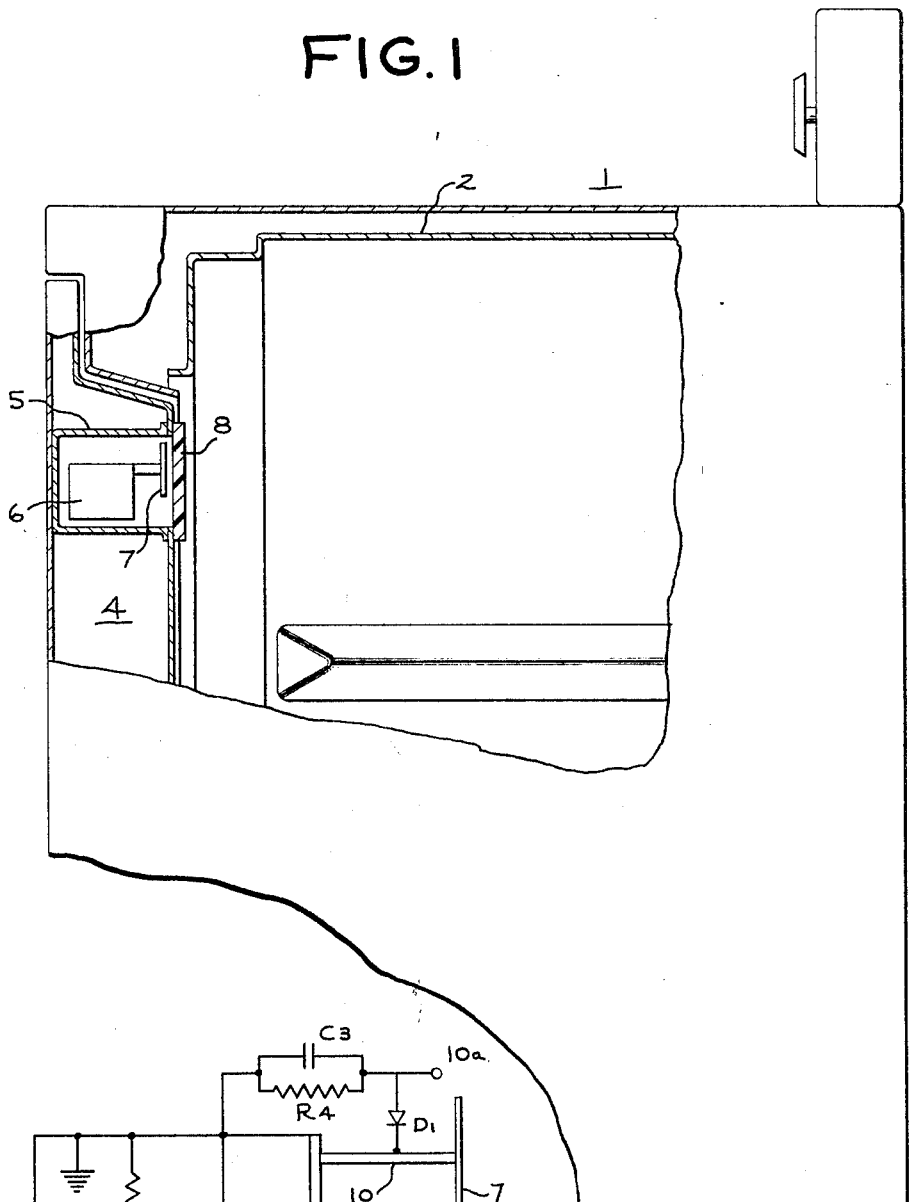
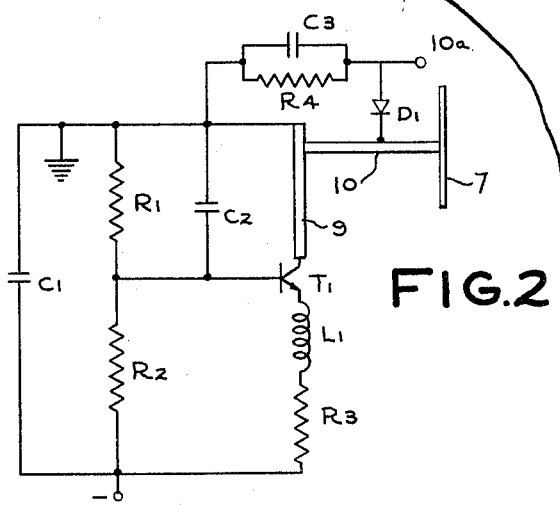
INVENTOR.
GLENN R. CHAFEE JR.
BY
HIS ATTORNEY Dec. 6, 1966  G. R. CHAFEE, JR  3,290,587
DRYNESS SENSOR FOR AUTOMATIC FABRIC DRYING MACHINE
Filed March 16, 1964  2 Sheets-Sheet 2
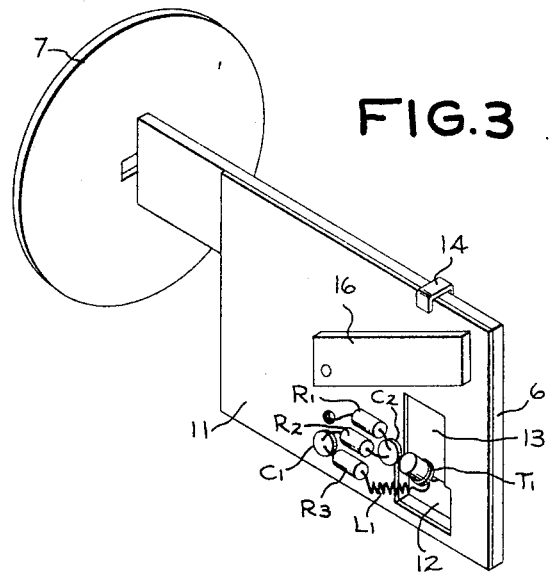
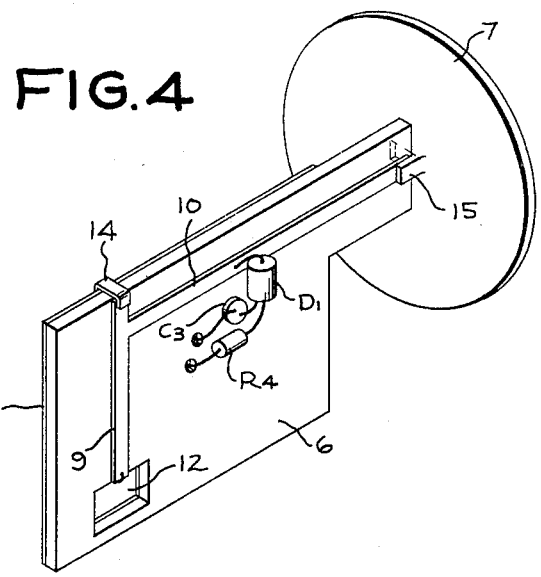
INVENTOR.
GLENN R. CHAFEE JR.
BY
HIS ATTORNEY United States Patent Office 3,290,587
Patented Dec. 6, 1966

3,290,587
DRYNESS SENSOR FOR AUTOMATIC FABRIC
DRYING MACHINE
Glenn R. Chafee, Jr., Louisville, Ky., assignor to General
Electric Company, a corporation of New York
Filed Mar. 16, 1964, Ser. No. 352,052
4 Claims. (Cl. 324—58.5)

The present invention relates to automatic fabric drying machines and, more specifically, to an improved dryness sensor for use with such machines.

Prior art fabric drying machines have generally employed timers to terminate a drying cycle when the fabrics are substantially dry. However, such devices require that the operator estimate the drying time required and set a timer accordingly. A number of prior art systems have been available whereby dryness is sensed automatically and the operation of the machine terminated when a perscribed dryness has been reached. Generally, such automatic dryness sensors have operated by sensing changes in effluent heat or electrical resistance as the fabric dries. However, such prior art automatic systems have not been completely satisfactory in achieving the requisite high degree of sensitivity and accuracy necessary to prevent overdrying or underdrying because of the relatively indirect manner in which dryness is sensed.

Another more direct and satisfactory prior art dryness sensor features the transmission of high frequency electromagnetic waves into the fabric container of a fabric drying machine. The frequency of the transmitted electromagnetic waves is related to the dimensions of the fabric container in such a manner that the reflection of the electromagnetic waves from the fabric container varies toward a predetermined pattern as dryness is approached. The wet fabrics within the container, by the absorption and reflection of the electromagnetic waves, modify the pattern of wave reflection from that existent when the container is empty. As the fabrics dry, the wave pattern approaches more closely the empty container condition. Thus, by the provision of a detector to determine the pattern of reflection it is possible to automatically terminate drying when the desired dryness condition is reached.

Although dryness sensors featuring the detection of reflected electromagnetic waves have achieved the requisite sensitivity and accuracy, such sensors have heretofore been relatively complex and expensive.

The present invention provides a simplified electromagnetic wave dryness sensor which is less expensive than prior art devices while still maintaining the requisite sensitivity and accuracy.

Accordingly, an object of the present invention is to provide an improved dryness sensor.

Another object is to provide a simplified dryness sensor featuring the reflection of high frequency electromagnetic waves to indicate dryness.

Still another object is to provide a dryness sensor employing the reflection of high frequency electromagnetic waves which is less expensive than prior art devices while maintaining the requisite sensitivity and accuracy.

These and other objects are achieved in one embodiment of the invention through the use of a single circuit board having a ground plane affixed to one surface thereof. The components of a transistorized oscillator employing a microstrip line as a resonant element are mounted directly on the circuit board as are the requisite detector and antenna. In this manner, a compact, simplified assembly is realized.

The novel and distinctive features of the invention are set forth in the appended claims. The invention itself, together with further objects and advantages thereof, may be best understood by reference to the following description and accompanying drawings in which:

FIGURE 1 is a side view, partially broken away of a fabric drying machine employing the dryness sensor of the present invention.

FIGURE 2 is a circuit diagram of the oscillator and detector employed in the dryness sensor of the present invention.

FIGURES 3 and 4 are perspective views of the dryness sensor of the present invention.

In FIGURE 1, there is shown a fabric drying machine 1 having a fabric container, such as a rotatable tumbler 2, in which are placed the fabrics to be dried. The fabric drying machine is provided with suitable heating elements and means to direct a heated stream of drying air to the fabrics (not shown).

The fabric drying machine 1 is provided with an access door 4, a chamber 5 being positioned within the access door 4 to receive the dryness sensor of the present invention. The dryness sensor comprises a circuit board 6 having a ground plane affixed to one surface thereof and upon which is positioned an oscillator for the generation of high frequency oscillations and a detector for the detection of waves reflected from the fabric container. Antenna 7 is affixed to the circuit board 6, the antenna 7 communicating with the container 2 through an electromagnetic wave transparent window 8.

Referring to FIGURE 2, there is shown a circuit diagram of the dryness sensor of the present invention. The oscillator comprises a transistor $T_1$ having a microstrip line 9 connected between its collector and ground. The microstrip line comprises a metal strip on the opposite side of the circuit board from the ground plane and is formed in accordance with well-known printed circuit techniques. A second microstrip line 10 is connected between an intermediate point of the microstrip line 9 and the antenna 7 to couple the generated oscillations to the antenna. The base of the transistor $T_1$ is connected to the intermediate point of a voltage divider comprising resistances $R_1$ and $R_2$ connected between a suitable negative supply and ground to establish a fixed bias voltage at the base. Emitter choke $L_1$ and current-limiting resistance $R_3$ are serially connected between the emitter of transistor $T_1$ and the negative supply, the choke $L_1$ serving to cause the collector-to-emitter capacitance of the transistor to be fully effective in providing feedback to establish oscillations. A.C. bypass capacitors $C_1$ and $C_2$ are respectively connected between the negative supply and ground and between the base of the transistor $T_1$ and ground.

The detector comprises a diode $D_1$ connected to an intermediate point of the microstrip line 10 and to ground through a parallel R-C circuit comprising resistance $R_4$ and capacitance $C_3$, the detector serving to automatically terminate the drying operation when a predetermined pattern of reflection corresponding to substantial dryness is reached.

The operation of the oscillator of FIGURE 2 is such that the internal collector-to-emitter capacitance of the transistor $T_1$ causes positive feedback from the collector to the emitter, thereby developing oscillations. By utilizing the internal capacity of the transistor, the use of a separate feedback capacitor is obviated. The collector-to-emitter capacitance of the transistor $T_1$ is made fully effective by connecting a large reactance choke $L_1$ to the emitter of the transistor in accordance with known techniques, the resistance $R_3$ serving as a current-limiting resistance. The feedback between the collector and emitter of transistor $T_1$ results in oscillations appearing across the microstrip line 9 which serves as a collector tuned circuit and which is resonant at the desired frequency. The resultant oscillations across the microstrip line 9 are coupled to the antenna 7 through the microstrip line 10.

The antenna 7 transmits electromagnetic waves into the fabric container of the fabric drying machine. The electromagnetic waves thus generated are reflected from the container in accordance with the degree of dryness of the fabrics contained therein. The reflected waves are detected and utilized to automatically terminate the drying operation when a predetermined pattern of reflection corresponding to substantial dryness is achieved. Such detection can be achieved in several ways but can be expediently effected by measuring the variations in the voltage standing wave ratio of the microstrip line 10. The diode $D_1$, in conjunction with the R-C network comprised of the capacitor $C_3$ and resistance $R_4$, serves to detect the standing wave ratio and thus the degree of dryness of the fabric within the tumbler. The detected signal appearing at the output terminal 10a is applied to suitable amplifying and relay means (not shown) to automatically terminate the drying operation when a prescribed detected signal corresponding to substantial dryness is realized.

Referring to FIGURES 3 and 4, there is shown the physical placement of the circuit elements shown in FIGURE 2 with respect to the circuit board 6 shown in FIGURE 1, like reference numerals being given to identical elements.

The circuit board 6 is provided with a metal ground plane 11, a cut-out 12 being provided through circuit board. The ground plane is also removed from the circuit board 6 in the area 13.

The collector of the transistor $T_1$ is electrically connected through the cut-out portion 12 in the circuit board to the microstrip line 9, as shown more clearly in FIGURE 4. A grounding strap 14 is provided to electrically connect the end of the microstrip line 9 to the ground plane 11.

The circuit elements of the oscillator are mounted directly on the side of the circuit board to which the ground plane is affixed. Similarly, the circuit elements of the detector are mounted on the opposite side of the circuit board, connection being made to the ground plane through holes provided in the circuit board. The antenna 7 is provided with a tab portion 15, as shown most clearly in FIGURE 4, for attachment of the antenna to the microstrip line 10.

As shown in FIGURE 3, a metal bar 16 is pivotally connected to the circuit board 6 in electrical connection with the ground plane 11. The bar can be pivoted over the area 13 where the ground plane is removed opposite the microstrip line 9 to vary the disturbed electrical characteristics of the microstrip line 9 and thus effect tuning of the device. It will be appreciated that other tuning methods might advantageously be employed.

The dryness sensor shown in FIGURES 3 and 4 can be fabricated in accordance with well-known printed circuit techniques and thus provides a simplified, compact assembly ideally suited for use in commercial fabric dryers.

It is noted that the particular fabric container employed will define the values of the circuit elements and the dimensions and placement of the two microstrip lines and antenna of the present invention.

Broadly, the length of microstrip line 9 is selected to provide a frequency of oscillation in the desired range. Optimum results were found to obtain when the microstrip line 10 had a length which was an odd integral number of one-quarter wavelengths at the frequency of oscillation (1, 3, 5, etc.). The microstrip line 10 is loosely coupled to the microstrip line 9 by connecting line 10 at a point near the ground side of line 9. Such loose coupling is desirable to prevent loading of the oscillator and thus spurious operation under varying conditions of fabric dryness.

By constructing the antenna 7 with dimensions such that the antenna is non-resonant, it is found that these dimensions are not critical, although the antenna should be large enough to provide good coupling with the chamber.

The point at which the detector diode $D_1$ is connected to the microstrip line 10 is chosen to give a maximum difference in the detected signal between the wet fabric and dry fabric conditions.

In one particularly successful embodiment of the present invention the following circuit values and dimensions were employed in a sensor operating at a frequency of 920 mcs. in conjunction with a cylindrical fabric container having a 25 inch diameter and a depth of 18 inches.

*Circuit values*

| | |
|---|---|
| $R_1$ | 10K |
| $R_2$ | 1.5K |
| $R_3$ ohms | 330 |
| $R_4$ | 10K |
| Transistor $T_1$ | 2N918 |
| Diode $D_1$ | 1N82A |
| $C_1$ pf | 1000 |
| $C_2$ pf | 1000 |
| $C_3$ pf | 1000 |

$L_1$, 8 turns #30 wire ⅛″ O.D.

*Dimensions*

Length microstrip line 9—1.200 inches

Width microstrip line 9—0.125

Length microstrip line 10—1.760 to end of ground plane plus 1.015 to antenna

Width microstrip line 10—0.125

Distance from ground end of line 9 to point where line 10 connected—0.075

Distance from line 9 to point where diode $D_1$ connected—1.750

Thickness of printed circuit board—0.062 inch

Diameter of antenna—1.800

Although the invention has been described with respect to a specific embodiment, it will be appreciated that modifications and changes may be made by those skilled in the art without departing from the spirit and scope of the invention.

What I claim as new and desire to secure by Letters Patent of the United States is:

1. A sensor for determining dryness of the contents of the fabric container of a fabric drying machine, said sensor comprising:
   (a) a circuit board having a ground plane affixed to one surface thereof,
   (b) oscillator means for generating a high frequency electric current,
      (1) said oscillator means including a microstrip line affixed to said circuit board on the side opposite said ground plane and resonant at said high frequency,
   (c) antenna means positioned for transmitting electromagnetic waves to the fabric container and for receiving the electromagnetic waves reflected therefrom,
   (d) means connecting said microstrip line to said antenna means, and
   (e) means connected to said antenna for detecting the electromagnetic waves reflected from the fabric container.

2. A sensor for determining dryness of the contents of the fabric container of a fabric drying machine, said sensor comprising:
   (a) a circuit board having a ground plane affixed to one surface thereof,
   (b) oscillator means for generating a high frequency electric current,
      (1) said oscillator means including a first microstrip line affixed to said circuit board on the side opposite said ground plane and resonant at said high frequency,
   (c) antenna means positioned for transmitting electromagnetic waves to the fabric container and for receiving the electromagnetic waves reflected therefrom,
   (d) a second microstrip line affixed to said circuit board on the side opposite said ground plane, (1) said second microstrip line being connected between said first microstrip line and said antenna means, and (e) means connected to said second microstrip line for detecting the electromagnetic waves reflected from the fabric container.

3. A sensor for determining dryness of the contents of the fabric container of a fabric drying machine, said sensor comprising:

(a) a circuit board having a ground plane affixed to one surface thereof, (b) an oscillator affixed to said circuit board for generating a high frequency electric current, (1) said oscillator including a first microstrip line affixed to said circuit board on the side opposite said ground plane and resonant at said high frequency, (c) an antenna affixed to said circuit board and positioned for transmitting electromagnetic waves to the fabric container and for receiving the electromagnetic waves reflected therefrom, (d) a second microstrip line affixed to said circuit board on the side opposite said ground plane, (1) said second microstrip line being connected between said first microstrip line and said antenna, (e) a diode detector connected to said second microstrip line for detecting the electromagnetic waves reflected from the fabric container.

4. The sensor as defined in claim 3 wherein said oscillator comprises:

(a) a transistor having base, emitter and collector electrodes, (b) a voltage divider connected across a source of voltage, (c) said base being connected to an intermediate point of said voltage divider, (d) said emitter being connected to a source of voltage through an inductance, (e) said collector being connected to said first microstrip line, (f) whereby the emitter-collector capacitance of said transistor provides positive feedback between said collector and emitter to develop said high frequency oscillations across said first microstrip line.

References Cited by the Examiner
UNITED STATES PATENTS

| | | | |
|---|---|---|---|
| 2,948,966 | 8/1960 | Hanson | 34—1 |
| 3,015,042 | 12 1961 | Pinckaers | 307—88.5 |
| 3,047,850 | 7/1962 | Schmidt | 331—117 X |
| 3,079,552 | 2/1963 | Walker | 324—58.5 |
| 3,147,435 | 9/1964 | Blattner | 324—83 |
| 3,159,798 | 12/1964 | Burns | 331—117 X |
| 3,165,708 | 1/1965 | Stelmak et al. | 331—108 |
| 3,216,661 | 11/1965 | Sawyer | 324—58.5 X |

RUDOLPH V. ROLINEC, *Primary Examiner.*

WALTER L. CARLSON, *Examiner.*

A. E. RICHMOND, *Assistant Examiner.*